(12) United States Patent
Maier et al.

(10) Patent No.: US 9,732,861 B2
(45) Date of Patent: Aug. 15, 2017

(54) PISTON VALVE

(71) Applicant: ROBERT BOSCH AUTOMOTIVE STEERING GMBH, Schwaebisch Gmuend (DE)

(72) Inventors: Martin Maier, Schwaebisch Gmuend (DE); Markus Rief, Ellwangen (DE); Werner Bernhard, Moegglingen (DE)

(73) Assignee: ROBERT BOSCH AUTOMOTIVE STEERING GMBH, Schwaebisch Gmuend (DE)

( * ) Notice: Subject to any disclaimer, the term of this patent is extended or adjusted under 35 U.S.C. 154(b) by 15 days.

(21) Appl. No.: 14/892,393

(22) PCT Filed: May 19, 2014

(86) PCT No.: PCT/EP2014/060184
§ 371 (c)(1),
(2) Date: Nov. 19, 2015

(87) PCT Pub. No.: WO2015/000623
PCT Pub. Date: Jul. 8, 2015

(65) Prior Publication Data
US 2016/0116073 A1    Apr. 28, 2016

(30) Foreign Application Priority Data
Jul. 5, 2013  (DE) .......................... 10 2013 107 097

(51) Int. Cl.
*F16K 3/26*      (2006.01)
*F16K 31/524*    (2006.01)
(Continued)

(52) U.S. Cl.
CPC ............... *F16K 3/26* (2013.01); *B62D 5/087* (2013.01); *F16K 11/0716* (2013.01);
(Continued)

(58) Field of Classification Search
CPC .. F16K 3/26; F16K 11/0716; F16K 31/52475; F16K 31/52483; B62D 5/087; Y10T 137/86654
See application file for complete search history.

(56) References Cited

U.S. PATENT DOCUMENTS 2,922,440 A * 1/1960 Hardy .................... B62D 5/087
                                                   137/625.68
2,932,283 A * 4/1960 Jeffery ................... B62D 5/087
                                                   137/85

(Continued)

FOREIGN PATENT DOCUMENTS

DE      29 31 139     2/1981
DE      3 1 22 368   12/1982
(Continued)

*Primary Examiner* — Craig Schneider
*Assistant Examiner* — Kevin Barss
(74) *Attorney, Agent, or Firm* — Jordan and Koda, PLLC

(57) ABSTRACT

A valve for controlling a fluid flow comprising: an inner sleeve having a control surface and a middle sleeve, wherein a first movement of the inner sleeve with respect to the middle sleeve can be carried out, wherein the valve comprises a control piston, wherein the first movement prompts a second movement of the control piston, whereby the valve is moved into a switched state.

12 Claims, 6 Drawing Sheets

(51) Int. Cl.
*F16K 11/07* (2006.01)
*B62D 5/087* (2006.01)

(52) U.S. Cl.
CPC .. *F16K 31/52475* (2013.01); *F16K 31/52483* (2013.01); *Y10T 137/86654* (2015.04)

(56) References Cited

U.S. PATENT DOCUMENTS

| | | | | |
|---|---|---|---|---|
| 3,110,321 | A * | 11/1963 | Broad | F15B 13/043 |
| | | | | 137/596.15 |
| 3,367,354 | A * | 2/1968 | Gallant | B62D 5/087 |
| | | | | 137/115.17 |
| 3,922,953 | A * | 12/1975 | Strauff | B62D 5/061 |
| | | | | 137/112 |
| 4,022,110 | A * | 5/1977 | Strauff | B62D 5/22 |
| | | | | 91/371 |
| 4,272,056 | A * | 6/1981 | Komamura | B62D 5/083 |
| | | | | 137/625.22 |
| 4,339,986 | A * | 7/1982 | Atkin | B62D 5/083 |
| | | | | 137/625.24 |
| 4,361,076 | A * | 11/1982 | Gluck | B62D 5/22 |
| | | | | 180/428 |
| 4,555,975 | A * | 12/1985 | Lang | B62D 5/08 |
| | | | | 91/417 R |
| 5,259,474 | A * | 11/1993 | Emori | B62D 5/087 |
| | | | | 137/116.3 |
| 5,685,332 | A | 11/1997 | Overdiek et al. | |
| 6,267,133 | B1 | 7/2001 | Hofmann et al. | |
| 7,152,627 | B2 * | 12/2006 | Danley | B62D 5/0837 |
| | | | | 137/625.23 |
| 2005/0258384 | A1 | 11/2005 | Leutner | |

FOREIGN PATENT DOCUMENTS

| | | |
|---|---|---|
| DE | 441 31 449 | 3/1993 |
| DE | 41 38 885 | 6/1993 |
| DE | 42 09 647 | 9/1993 |
| DE | 196 12 872 | 10/1997 |
| DE | 197 40 352 | 3/1999 |
| DE | 102 54 687 | 6/2004 |
| DE | 10 2004 015 991 | 11/2005 |
| DE | 10 2005 058625 | 6/2006 |
| DE | 10 2005 006418 | 8/2006 |
| EP | 0 676 680 | 10/1995 |
| GB | 2 055 718 | 3/1981 |
| WO | WO-90/03295 | 4/1990 |
| WO | WO-94/02345 | 2/1994 |

\* cited by examiner

PISTON VALVE

FIELD OF THE INVENTION

The present invention relates a valve for controlling a fluid flow and to a steering system for a vehicle.

BACKGROUND OF THE INVENTION

Valves that switch/control/guide a fluid flow in hydraulic or pneumatic systems are known in the prior art.

SUMMARY OF THE INVENTION

Valves comprising an inner sleeve, a middle sleeve and a valve housing are used to guide a fluid flow. The inner sleeve can be rotated relative to the middle sleeve, whereby different valve switching states can be implemented. Ports for feeding and discharging the fluid are disposed on the valve housing. Since the middle sleeve can be rotated across 360° with respect to the outer sleeve/the valve housing, feeding and discharging of the fluid takes place via annular grooves. So as to be able to ensure flawless function, the transitions are rounded, for example. For this purpose, axial machining must be carried out, in addition to radial machining. The introduction of the axial grooves on the inside walls of the middle sleeve is associated with a complex machining process. From a manufacturing engineering point of view, this machining process is complicated, in particular if the middle sleeve is very small. It is also problematic to set the "hydraulic center" of a valve during finishing/assembly/installation. A complex control system is required for this purpose. The "hydraulic center" represents a starting situation for the arrangement of the sleeves with respect to each other. In this starting state, for example, the fluid flow is conducted directly into the return flow.

One object is, therefore, to provide a valve that is easy to produce and/or which has a "hydraulic center" that is easy to set, or which allows for automatic setting of the "hydraulic center."

A first embodiment of the invention provides a valve for controlling a fluid flow comprising: an inner sleeve having a control surface and a middle sleeve, wherein a first movement of the inner sleeve with respect to the middle sleeve can be carried out, wherein the valve comprises a control piston, and wherein the first movement prompts a second movement of the control piston, whereby the valve is moved into a switched state.

As a result of the arrangement of a control piston, it is possible to dispense with axial machining of inside walls for guiding the fluid flow, whereby the production process for the valve is considerably simplified.

A second embodiment of the invention provides a steering system for a vehicle comprising a valve.

According to an exemplary embodiment of the invention, a valve is provided wherein, in the switched state, the fluid flow is guided in a first or a second direction or wherein the fluid flow is interrupted.

In a further embodiment according to the invention, a valve is provided wherein the first movement is a rotation/rotatory movement/axial displacement and/or wherein the second movement is a rotation/rotatory movement/axial displacement, wherein the axial displacement is a displacement in the direction of the longitudinal axis of the valve.

According to a further exemplary embodiment of the present invention, a valve is provided wherein the valve comprises a means for pressing the control piston against the control surface.

According to an exemplary embodiment of the invention, a valve is provided wherein the means is designed so as to act along the longitudinal axis of the valve.

Pressing of the control piston against the control surface allows the valve to automatically return to the starting situation thereof following a rotation, if the inclination of the control surface with respect to the longitudinal axis is suitably designed. The automatically settable starting situation can be defined as the "hydraulic center."

According to an exemplary embodiment of the invention, a valve is provided wherein the means is a spring.

A pressing pressure on the control piston can be generated in a simple manner by the use of a spring.

In a further embodiment according to the invention, a valve is provided wherein the control surface is inclined with respect to the longitudinal axis of the valve and/or wherein the control surface exposes more space or less space in the direction of the longitudinal axis for the control piston as a result of the first movement.

According to a further exemplary embodiment of the present invention, a valve is provided, wherein the valve comprises 1, 2, 3, 4, 5, 6, 7, 8 or an arbitrary number of control pistons.

Both through the use of an arbitrary number of control pistons and through the design/mechanical configuration of the individual control piston or pistons, the valve can be scaled in keeping with the requirements in terms of the fluid flow.

Providing a valve that can be switched by a control piston can be considered one idea of the invention. In this way, complex machining of inside walls of the sleeves of the valve can be dispensed with.

It is a matter of course that the individual features can also be combined with each other, whereby advantageous effects may be achieved in some instances, which exceed the sum of the individual effects.

Further details and advantages of the invention will be apparent based on the exemplary embodiments shown in the figures.

DETAILED DESCRIPTION OF THE PREFERRED EMBODIMENTS

Figure 1:
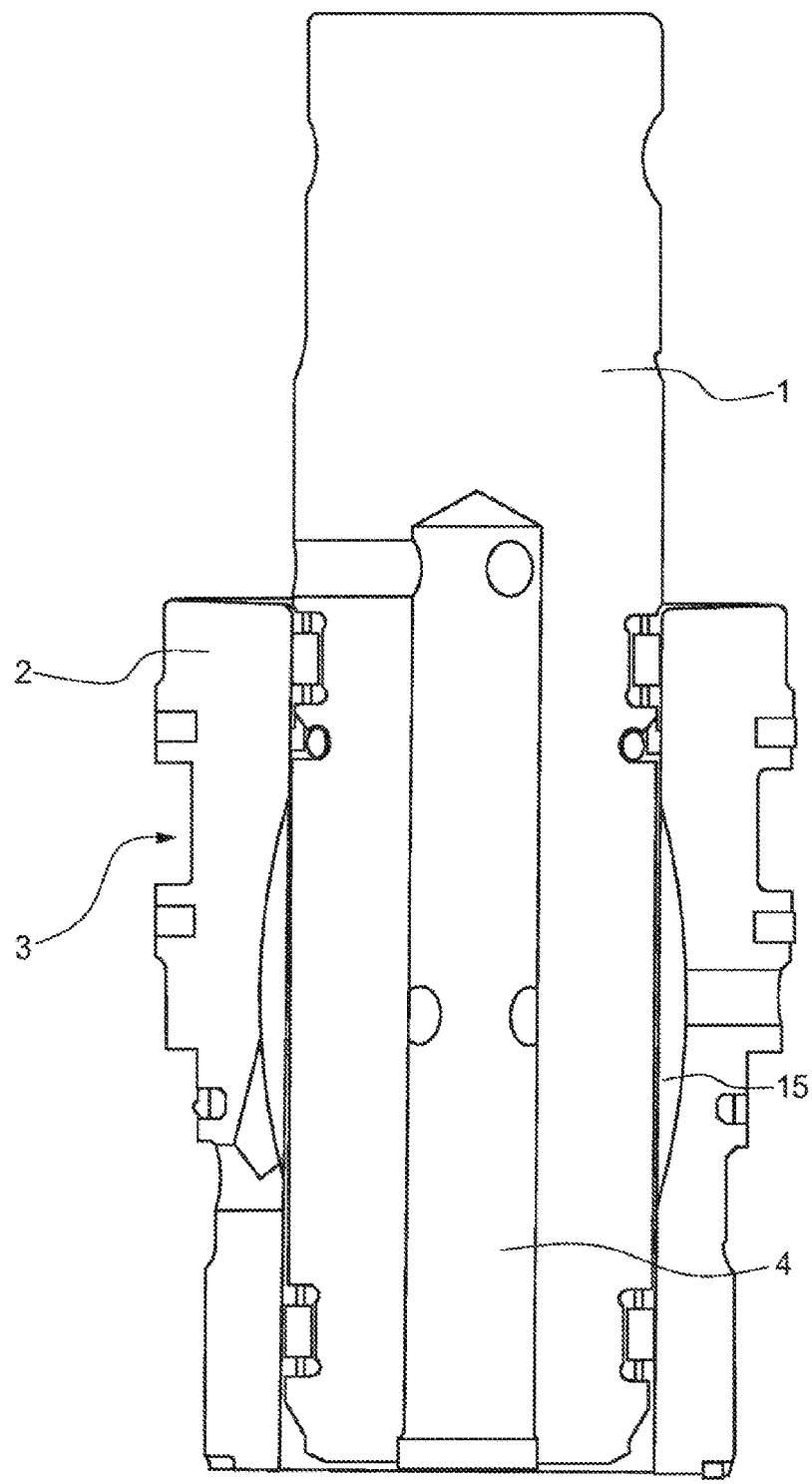
FIG. 1 shows a valve according to the prior art.

FIG. 1 shows a valve from the related art, comprising a middle sleeve 2 and an inner sleeve 1, wherein the inner sleeve 1 can be rotated with respect to the middle sleeve 2. The middle-sleeve 2 comprises longitudinal grooves 15, which are needed to ensure flawless feeding and discharging of the fluid. In addition to radial machining, the longitudinal grooves 15 also necessitate axial machining of the inside wall of the middle sleeve 2, which constitutes high complexity from a manufacturing engineering perspective.

Figure 2:
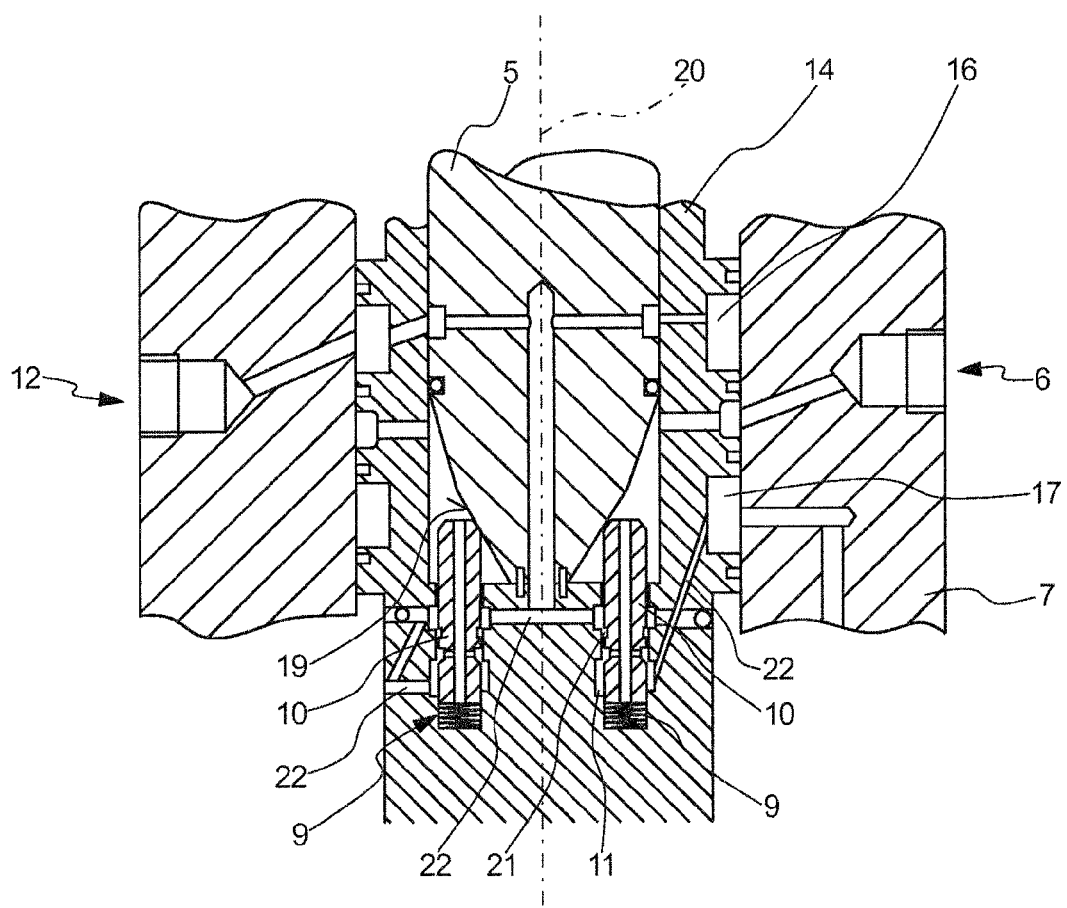
FIG. 2 shows a valve according to the invention.

FIG. 2 shows a valve according to the invention, comprising an inner sleeve 5, which can be rotated, and a middle sleeve 14. Feed and discharge lines 6, 12 for the fluid are disposed on a valve housing 7. Control pistons 10 can be mounted in the middle sleeve 14 and be held under tension by springs 9 in the axial direction, which is to say in the direction of the longitudinal axis 20 of the valve, and are seated against a control surface 19. By turning/rotating the inner sleeve 5, the control surface 19, such as the inclination of the same, can change at the bearing point of the control piston 10, and the control pistons 10 can be displaced in the axial direction 20. Switching of the valve can result from the axial displacement of the control piston 10.

Figure 3:
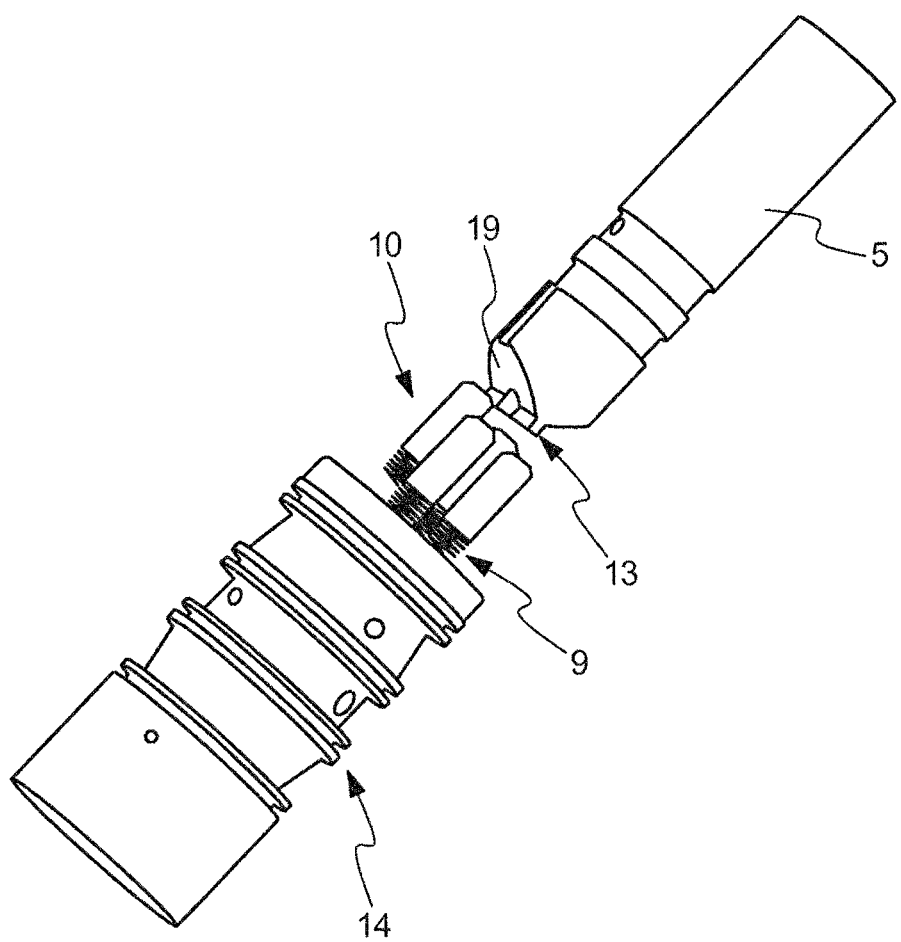
FIG. 3 shows the valve according to the invention in an exploded view.

FIG. 3 shows the valve according to the invention in an exploded view, comprising the inner sleeve 5 and the middle sleeve 14, wherein the control pistons 10 are disposed in the middle sleeve 14. The control pistons 10 are held under mechanical tension by springs 9 and are pressed against the control surface 19. Rotation of the inner sleeve 5 likewise causes the control surface 18 to be rotated, such that the control pistons 10 will be displaced in the axial direction.

Figure 4:
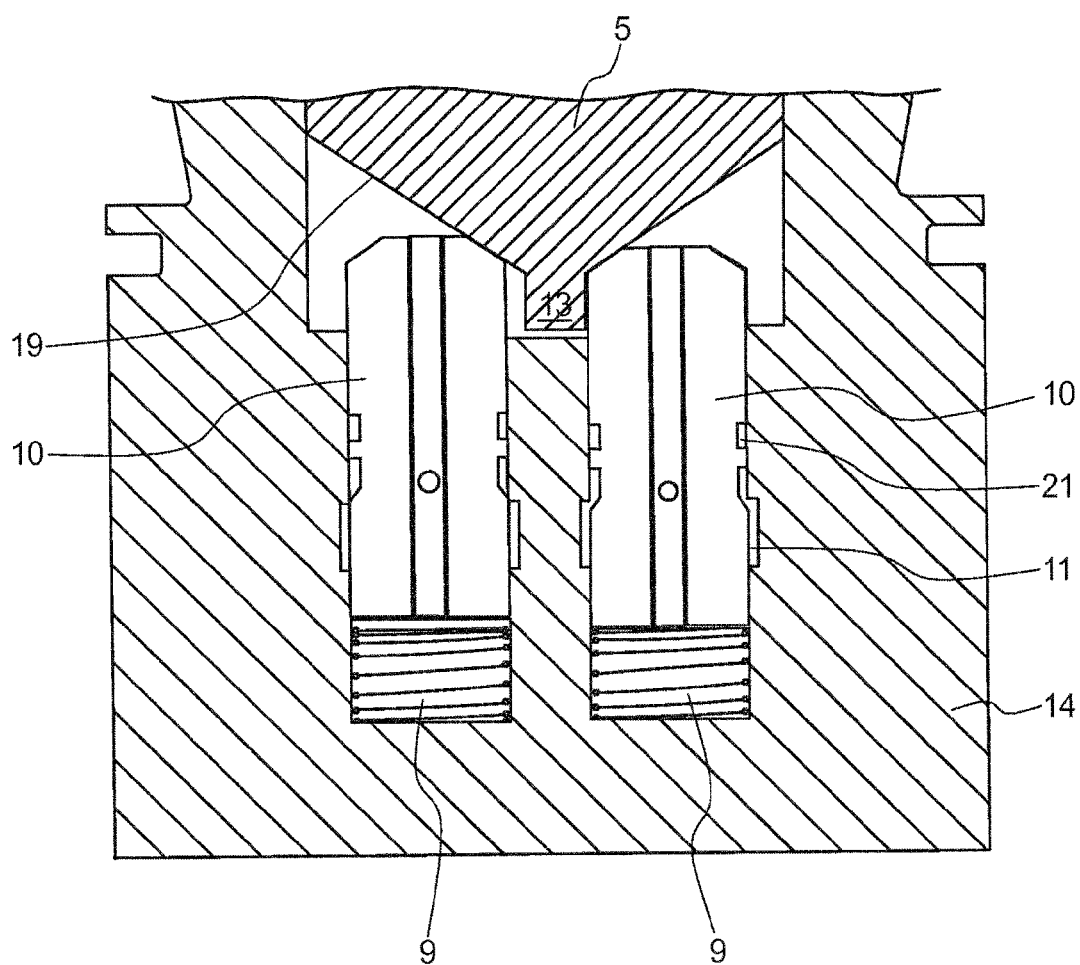
FIG. 4 shows a longitudinal sectional illustration of a section of the valve according to the invention.

FIG. 4 shows a longitudinal sectional illustration of a section of a valve according to the invention, comprising the Inner sleeve 5, the middle sleeve 14, and the control piston 10. The control pistons 10 are pressed by springs 9 against the control surface 19 of the inner sleeve 5. When the inner sleeve 5 is rotated, the control surface 19 is likewise displaced, such that the control pistons 10 will be pressed downward or the control surfaces 19 will expose space/room upwardly, and the control pistons 10 will be pressed upwardly by the springs 9. In this way, axial displacement of the control pistons is achieved. The axial displacement can be used to connect/interrupt annular grooves or grooves 11, 21, whereby switching states of the valve can be implemented. Following the rotation, a return of the rotation may take place as a result of the control pistons 10 pressing against the control surface 19, whereby the valve is automatically moved into a starting state.

Figure 5:
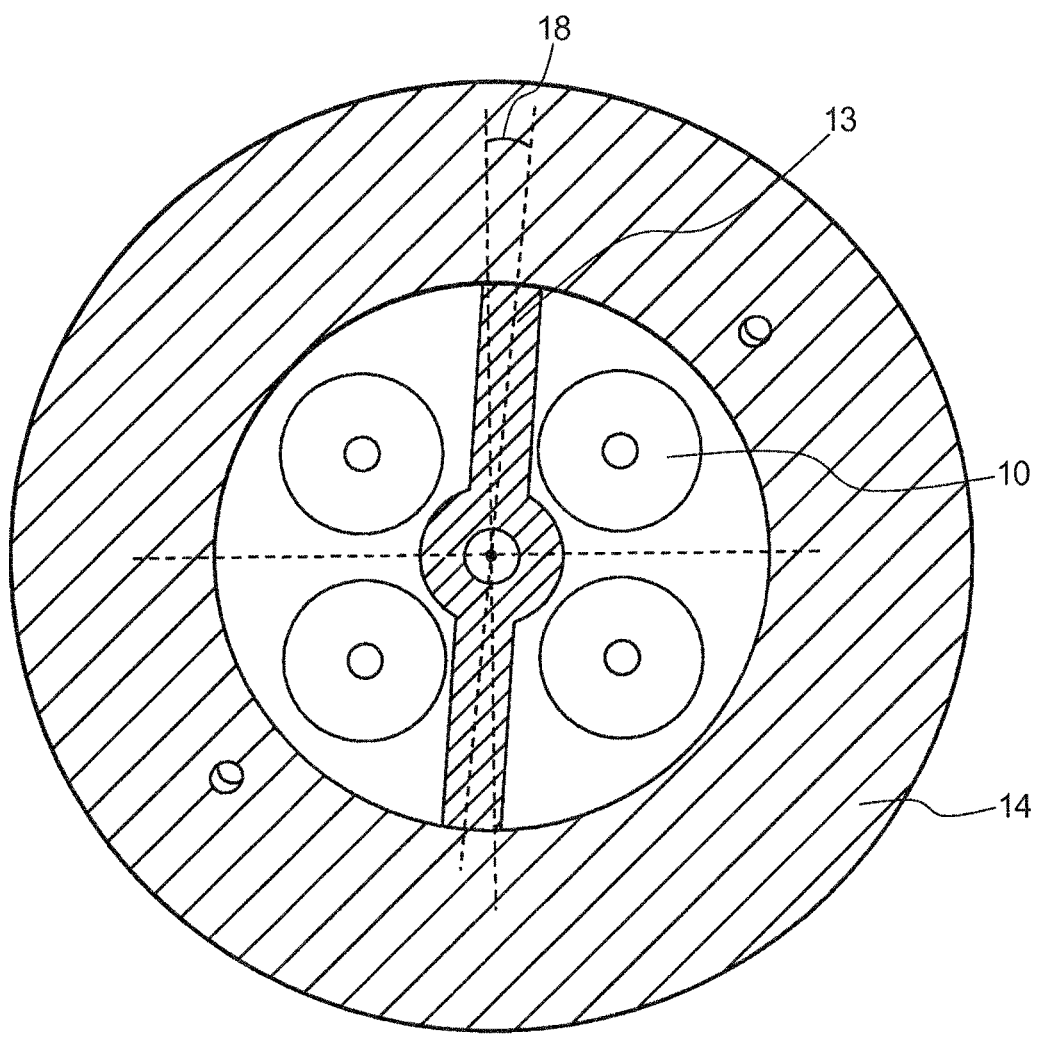
FIG. 5 shows a cross-sectional illustration of the valve according to the invention.

FIG. 5 shows the valve according to the invention in a cross-sectional illustration, comprising the control pistons 10, which are mounted inside the middle sleeve 10. In addition, a mechanical stop 13 is shown, which ensures that a maximum rotation of the control surfaces 19 is not exceeded.

Figure 6:
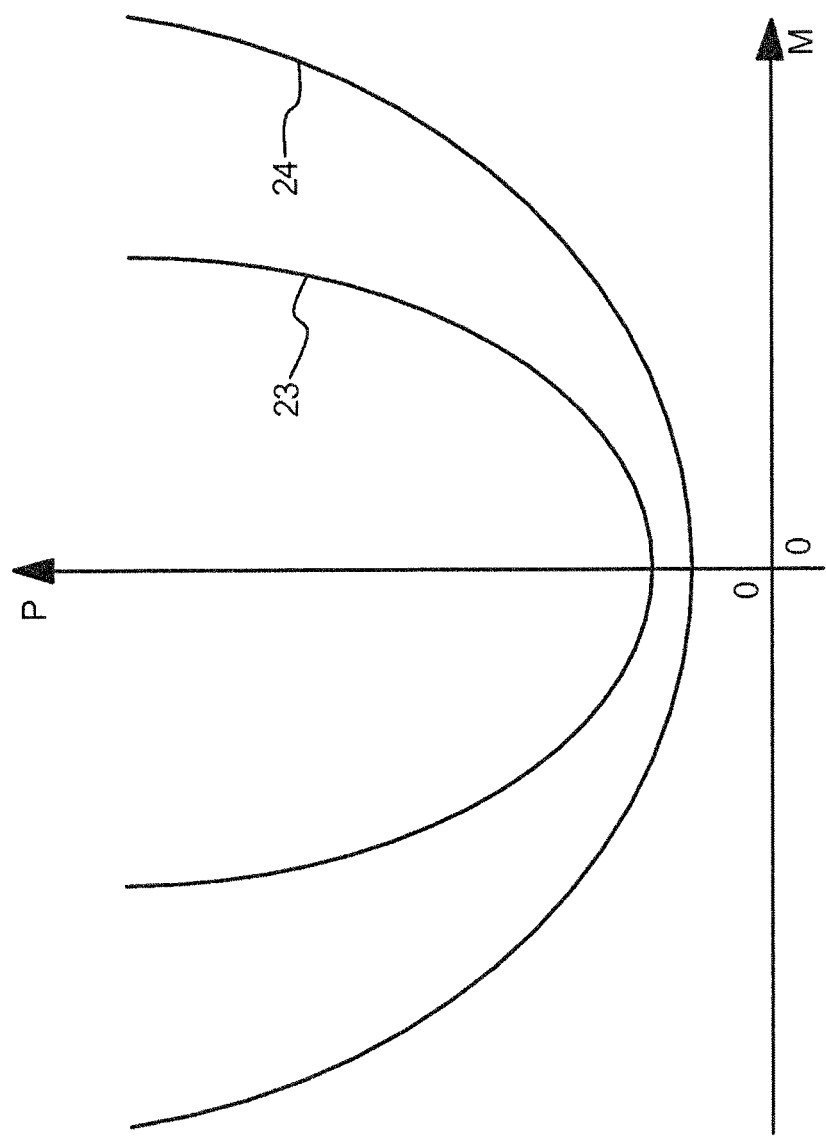
FIG. 6 shows curves illustrating the relationship between torque and pressure.

FIG. 6 shows a diagram illustrating a relationship between a torque M, which is exerted on the inner sleeve 5, and a pressure P within the system resulting therefrom. The system can have a pneumatic or hydraulic design, it is shown that advantageously a different characteristic curve 23, 24 can be selected by varying the spring properties (soft/rigid spring). When the characteristic curve 23 ("soft" spring) is selected, a small torque results in high change in pressure on the inner sleeve 5. If a "rigid" spring was used, low torque only results in a small change in pressure in the system.

It shall be noted that the term "comprise" does not exclude additional elements or method steps; likewise, the term "a" or "one" does not exclude multiple elements and steps.

The reference numerals used are provided merely for the sake of better understanding and shall not be considered to be limiting under any circumstances, the claims reflecting the scope of the invention for which protection is sought.

LIST OF REFERENCE NUMERALS 1 inner sleeve
2 middle sleeve
3 annular groove
4 valve gate
5 inner sleeve/rotary slide
6 feed
7 outer sleeve/valve housing
9 spring
10 control piston
11 groove
12 return
13 mechanical stop
14 middle sleeve
15 longitudinal groove
18 annular groove
17 annular groove
18 angle α
19 control surface
20 longitudinal axis
21 groove
22 feed or discharge of the fluid
23 "soft" spring
24 "hard" spring
P pressure
M torque

The invention claimed is:

1. A valve for controlling a fluid flow, comprising:
an inner sleeve having a control surface; and
a middle sleeve, wherein a first movement of the inner sleeve with respect to the middle sleeve can be carried out, wherein the valve comprises a control piston, the first movement prompting a second movement of the control piston, whereby the valve is moved into a switched state;
wherein the valve comprises a means for pressing the control piston against the control surface; and
wherein the control surface is inclined with respect to the longitudinal axis of the valve and/or wherein the control surface exposes more space or less space in the direction of the longitudinal axis for the control piston as a result of the first movement.

2. The valve according to claim 1, wherein, in the switched state, the fluid flow is guided in a first or a second direction or the fluid flow is interrupted.

3. The valve according to claim 1 wherein the first movement is a rotation/rotatory movement/axial displacement and/or wherein the second movement is a rotation/rotatory movement/axial displacement, wherein the axial displacement is a displacement in the direction of the longitudinal axis of the valve.

4. The valve according to claim 1, wherein the means is designed so as to act along the longitudinal axis of the valve.

5. The valve according to claim 1, wherein the means is a spring.

6. A valve according to claim 1, wherein the valve comprises 1, 2, 3, 4, 5, 6, 7, 8 or an arbitrary number of control pistons.

7. A steering system for a vehicle, comprising a valve according to claim 1.

8. The valve of claim 1, wherein the control surface is inclined with respect to the longitudinal axis of the valve.

9. The valve of claim 1, wherein the control surface exposes more space in the direction of the longitudinal axis for the control piston as a result of the first movement.

10. The valve of claim 9, wherein the control surface is inclined with respect to the longitudinal axis of the valve.

11. The valve of claim 1, wherein the control surface exposes less space in the direction of the longitudinal axis for the control piston as a result of the first movement.

12. The valve of claim 11, wherein the control surface is inclined with respect to the longitudinal axis of the valve.

* * * * *